July 26, 1949.  W. McGILL  2,477,073
BRAKE FOR FISHING REELS
Filed Dec. 23, 1947
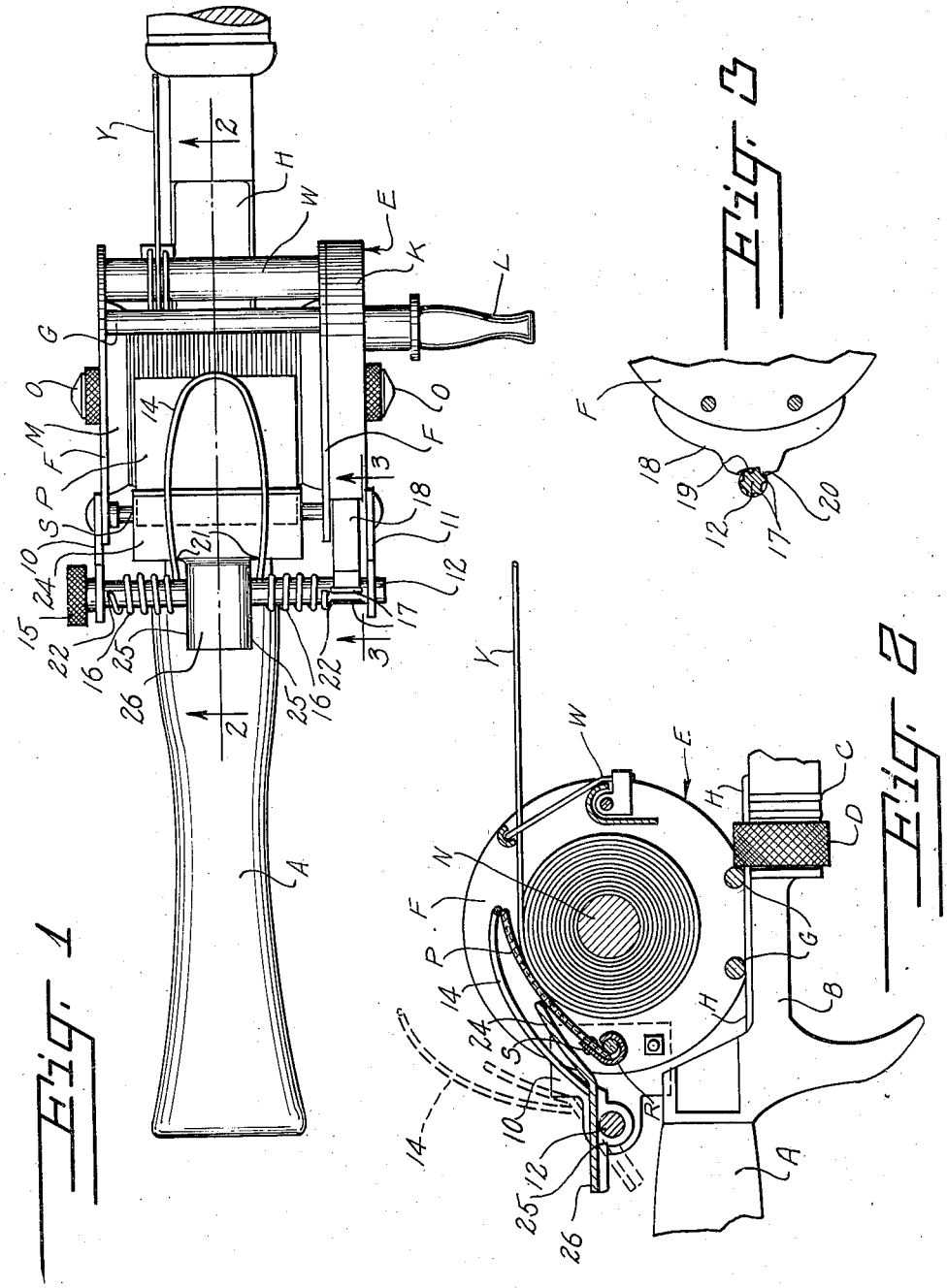
INVENTOR.
William McGill
BY
McMorrow, Berman + Davidson
Attorneys Patented July 26, 1949

2,477,073

UNITED STATES PATENT OFFICE 2,477,073

BRAKE FOR FISHING REELS

William McGill, McAllen, Tex.

Application December 23, 1947, Serial No. 793,461

5 Claims. (Cl. 242—84.5)

This invention relates to an improved brake for fishing reels, whereby the unreeling of the fishing line may be automatically controlled to reduce the tendency of the line to unreel during the casting operation faster than the same is pulled out by the sinker, thus preventing the condition known as "back lashing."

The invention has for its chief object the provision of brake-control mechanism for attachment to a fishing reel of conventional construction, without substantial alteration of the structure of the reel or interference with the usual operating parts of the same.

A further object of the invention is to provide a brake for a fishing reel which can be adjusted for widely differing conditions of use, such as arise when sinkers of various weights are employed.

Another object is the provision of brake-control mechanism for fishing reels having means whereby the same can be applied and released at will, and which, when applied, is automatically effective to control the unreeling of the line.

A still further object is to provide a fishing reel brake mechanism of simple design and rugged construction, having few operating parts, and capable of withstanding the constant wear and rough usage to which such a device is likely to be subjected.

More specifically stated, the invention comprises a spring-pressed, pressure-applying member, carried on a rotatably mounted, adjustable shaft, having securing and releasing means for maintaining the same in adjusted condition to apply pressure to the reel brake, or entirely releasing the same therefrom.

The invention will best be understood from the following detailed description, constituting the specification of the same, when taken in conjunction with the annexed drawings, wherein:

Figure 1 is a top plan view of a portion of a fishing rod carrying a reel upon which the invention is mounted;

Figure 2 is a side elevational view of the apparatus illustrated in Figure 1, showing the reel and braking mechanism in cross-section, taken along the line 2—2, looking in the direction indicated by the arrows;

Figure 3 is a cross-sectional view taken along the line 3—3 of Figure 1, looking in the direction indicated by the arrows, and showing structural details of the mechanism by which the adjustment and release of the brake is controlled.

Referring to the drawings in greater detail, A indicates the handle of a conventional fishing rod having a reel seat B, screw-threaded portions C and threaded ring D for securing a reel on said seat. E indicates a reel of usual construction having side plates F which are connected by the rod G, said reel being mounted on a plate H. The casing K, at one side of said reel, contains the conventional gear mechanism, not shown, by which the spool M of the reel may be rotated by a crank L. The spool M of the reel operates on the shaft N mounted in jeweled bearings O. The reel is provided with the usual thumb brake comprising a leather pad P mounted on a plate R carried on a shaft S. The reel may also have a level winding mechanism, generally indicated by W, whereby the even winding of the fish line indicated by Y is assured.

The form of the reel brake illustrated in the drawings comprises brackets, fastened to opposite sides of the reel, a shaft supported in said brackets, and carrying spring means for applying pressure to the leather pad P.

The brackets indicated at 10 and 11 may be attached to the side plates of the reel by screws, welding or the like, or the brackets may be formed integrally with the parts of the reel which support them.

The shaft indicated at 12 is rotatable in the brackets 10 and 11 by means of an enlarged knurled head 15, and is provided near one end with teeth 17. A latch 18 having the form of an arcuate shoe is positioned for slidable movement on the periphery of the casing K. The latch 18 has an arcuate recess 19 of greater radius than the shaft 12, and provided with a tooth 20 at the lower extremity of said recess for engagement with the teeth 17.

The spring means for applying pressure to the leather pad T is preferably formed in one piece comprising a loop 14 having at each end coiled spring portions 16, arranged in spaced relation on the shaft 12. The free ends of the coiled spring portions 16 are inserted through holes 22 extending transversely through the shaft 12.

A bearing plate 24 having a flat portion bearing against the leather pad P is pivotally supported on the shaft 12 by downwardly extending perforated flanges 25. As best seen in Figure 1, the loop 14 of the spring means passes over the flat portion of the bearing plate and engages the edge portion 21 thereof, so that the same is pressed against the leather pad P when the spring means is in operative condition.

The portion 26 of the bearing plate between the downturned flanges 25 thereof extends beyond the shaft 12 sufficiently to be within easy reach of the thumb of a person operating the fishing reel. The portion 26 forms a means by which the bearing plate may be rotated about the shaft 12 to control, if desired, the pressure of the bearing plate and the loop 14 on the leather pad P.

In operation of the above-described embodiment of the invention, the shaft 12 is rotated by means of the knurled head 15 in a direction to wind up the coil spring portion 16. The tooth 20 of latch 18 engaging the teeth 17 retains the coil spring portion 16 in wound condition. In this condition of the mechanism, the loop 14 bears against the pad 15, pressing the same into contact with the line wound on the reel, thus checking the operation of the same in casting and preventing back lashing.

The loop 14 also bears upon the plate 24, which in turn bears upon the entire width of the pad P, thus providing a more even application of pressure to the pad.

The amount of pressure brought to bear upon the pad P can thus be regulated to adjust the reel for use with any desired weight of sinker or other fishing accessory attached to the line.

Under certain conditions, when it is desirable to release the pressure on the pad P, the same may be partially or wholly relieved by pressing slightly on the extension 26 of the plate 24 to oppose the action of the coil spring portions 16.

For use with fishing lures of a very light character, such as flies, it may be desirable to entirely release the pressure of the brake mechanism, in which case the latch 18 can be moved to bring the tooth 20 out of engagement with the teeth 17. The shaft 12 will then rotate to permit the coil spring portions 16 to unwind. The reel can then be operated in the usual way using the pressure of the thumb on the pad P, if desired, to check the speed of the reel.

The braking mechanism can, of course, be made in any desired proportions for attachment to reels of all sizes, and the invention thus provides a device of simple construction and wide application, having few parts, and capable of withstanding the hard usage to which such devices are customarily subjected.

It will, of course, be understood that the hereinbefore described embodiment of the invention is intended for purposes of illustration only, and numerous alterations in the details of construction and arrangement of the various parts can be made without departing from the spirit of the invention, or the scope of the appended claims.

Having now clearly shown and described the invention, what is claimed and desired to secure by Letters Patent is:

1. In a brake for a fishing reel having a pad engaging a line wound on said reel, means for applying pressure to said pad including a spring engaging said pad, and carried by a rotatable shaft mounted on said reel, and means for adjusting the pressure of said spring comprising teeth on said shaft and a latch carried on said reel for engagement with said teeth.

2. In a brake for a fishing reel having a pad engaging a line wound on said reel, means for applying pressure to said pad including a bearing plate engaging said pad and pivotally carried on a rotatable shaft mounted on said reel, a spring engaging said plate and carried on said shaft, and means for adjusting the pressure of said spring comprising teeth on said shaft and a latch carried on said reel for engagement with said teeth.

3. In a brake for a fishing reel having a pad engaging a line wound on said reel, means for applying pressure to said pad including a U-shaped member bearing on said pad, and terminating in coil springs carried on a rotatable shaft mounted on said reel, and means for adjusting the tension of said springs comprising teeth on said shaft and a latch carried on said reel for engagement with said teeth.

4. In a brake for a fishing reel having a pad engaging a line wound on said reel, means for applying pressure to said pad including a bearing plate engaging said pad and pivotally carried on a rotatable shaft mounted on said reel, a U-shaped member bearing on said pad, and terminating in coil springs carried on said shaft, and means for adjusting the tension on said springs comprising teeth on said shaft and a latch carried on said reel for engagement with said teeth.

5. In a brake for a fishing reel having a pad engaging a line wound on said reel, means for applying pressure to said pad including a spring engaging said pad and carried by a rotatable shaft mounted on said reel, means for adjusting the pressure of said spring comprising teeth on said shaft and a latch carried on said reel for engagement with said teeth, and means for relieving the pressure of said spring on said pad comprising a bearing plate engaging said pad beneath said spring and pivoted on said shaft.

WILLIAM McGILL.

REFERENCES CITED

The following references are of record in the file of this patent:

UNITED STATES PATENTS

| Number | Name | Date |
|---|---|---|
| 1,299,959 | Keyser | April 8, 1919 |